United States Patent Office 2,869,261
Patented Jan. 20, 1959

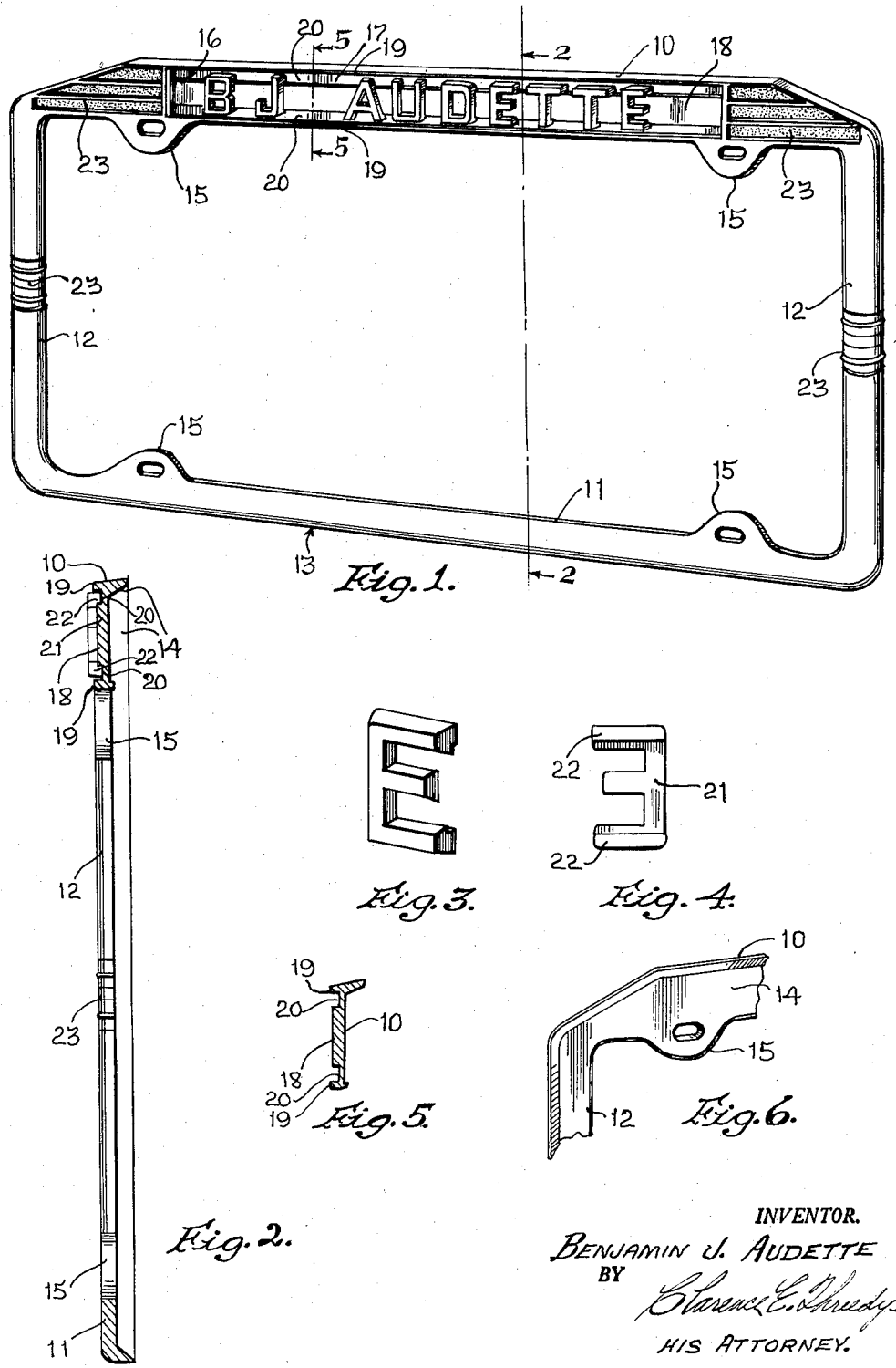
Jan. 20, 1959 — B. J. AUDETTE — 2,869,261
FRAMES FOR VEHICLE LICENSE PLATES OR THE LIKE
Filed May 20, 1954
INVENTOR.
BENJAMIN J. AUDETTE
HIS ATTORNEY.

2,869,261
FRAMES FOR VEHICLE LICENSE PLATES OR THE LIKE

Benjamin J. Audette, Los Angeles, Calif.

Application May 20, 1954, Serial No. 431,117

1 Claim. (Cl. 40—125)

This invention relates to certain new and useful improvements in frames for vehicle license plates or the like and has for its principal object the provision of a simple and economical arrangement for personalizing such plate.

More specifically, the invention has for its object the provision on the face of one of the bars of the frame, of an area extending longitudinally of such bar and providing within its confines a mounting strip or plate on which letters of the alphabet may be mounted to spell out the name of the owner of the license plate contained within the frame.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention;

Fig. 2 is a sectional detail view taken substantially on line 2—2 of Fig. 1;

Fig. 3 is a face elevational view of a letter embodied in the invention;

Fig. 4 is a rear view of the letter shown in Fig. 3;

Fig. 5 is a fragmentary sectional detail view taken substantially on line 5—5 of Fig. 1;

Fig. 6 is a fragmentary rear corner view of the license plate frame shown in Fig. 1.

The several objects of this invention are accomplished by the preferred form of construction shown in the accompanying drawings, in which drawings my improved holder comprises a top bar 10, a bottom bar 11, and side bars 12, integrally connected together to form substantially a rectangular frame 13. Surrounding the periphery of the frame are rearwardly extending flanges 14 between which and against the rear surfaces of the bars 10, 11 and 12, is adapted to be mounted a vehicle license plate (not shown).

Inwardly extending lugs 15 are provided on the inner edges of the bars 10 and 11 by means of which the license plate and the frame 13 may be connected by suitable bolts to supporting elements of the vehicle with which the frame and license plate are to be associated.

The top bar 10 provides a recessed area 16 which extends longitudinally of the bar 10 and terminates short of the ends thereof. On the wall 17 of this recess is integrally formed a mounting strip 18, the longitudinal edges of which define, together with the opposite edges 19 of the bar 10, grooves 20 which extend parallel to each other and to the strip 18.

The letters to be employed to spell out the name to whom the license plate has been assigned each are recessed as at 21 to provide gripping fingers 22. Between the gripping fingers 22 and within the recesses 21, the strip 18 is adapted to be frictionally received, the frictional engagement between the strip 18 and the letters being such as to firmly hold the letters in place upon the strip 18.

The frame 13 may be provided with ornamental sections 23 to add eye attraction.

If desired, in order to make more prominent the letters mounted on the strip 18, the enlarged recessed area 16 may be of a color in contrast with the letters, thus causing the letters to stand out prominently from the frame.

From the foregoing description, it will be apparent that I have provided a simple and novel arrangement for personalizing the license frame, with the result of associating the ownership of the license plate within the frame to the name which is carried by the frame within the area 16.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A license plate holder comprising frame bars integrally connected together to form a substantially rectangular frame, one of said frame bars having an enlarged area extending longitudinally with respect thereto and having formed in said area intermediate the ends thereof, a longitudinally extending mounting strip with said strip in substantially the same vertical plane with respect to said frame bars, indicia bearing members of a height greater than the width of said strip and of a lesser height than said enlarged area and recessed on one side to frictionally receive said strip so that the face of said members are contained within said area in a projected plane with respect to the vertical plane of said frame bars, said area having formed therein longitudinally extending grooves on opposite sides of said strip, said members having gripping fingers for projecting into said grooves, said fingers being of a width equal to the depth of said grooves so that when projected therein, said members will be in facial abutment with said strip.

References Cited in the file of this patent
UNITED STATES PATENTS

| | | |
|---|---|---|
| 1,536,414 | Watts | May 5, 1925 |
| 1,660,575 | Overton | Feb. 28, 1928 |
| 1,668,543 | Anderson | May 8, 1928 |
| 1,706,957 | Corbitt | Mar. 26, 1929 |
| 1,729,961 | Partridge | Oct. 1, 1929 |
| 2,342,237 | Barbieri | Feb. 22, 1944 |
| 2,689,423 | Atkin | Sept. 21, 1954 |